3,306,905
PRODUCTION OF PYRIDINE
Reginald Harold Hall, Carshalton, and Antony Harold Patrick Hall, New Malden, England, assignors to The Distillers Company Limited, Edinburgh, Scotland, a British company
No Drawing. Filed July 6, 1964, Ser. No. 380,613
Claims priority, application Great Britain, Aug. 8, 1963, 31,263/63; Oct. 23, 1963, 41,753/63; Oct. 30, 1963, 42,768/63; Nov. 30, 1963, 47,370/63; Jan. 24, 1964, 3,072/64; May 13, 1964, 19,904/64, 19,905/64
31 Claims. (Cl. 260—290)

This invention relates to the production of pyridine, and in particular to the production of pyridine by reacting ammonia with cyclic compounds containing heterocycilc oxygen.

Accordingly, the present invention is a process for the production of pyridine by the catalytic reaction in the vapour phase and at an elevated temperature of ammonia and a compound having the formula

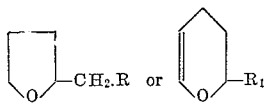

wherein R is the hydroxyl group or the amino group, and $R_1$ is an alkoxy group, an acyloxy group or the hydrogen atom characterised in that oxygen is included in the reaction mixture.

It is preferred to carry out the reaction in the presence of steam as this leads to particularly favourable yields.

The organic reactant employed in the present invention may be tetrahydrofurfuryl alcohol, tetrahydrofurfurylamine, 3,4-dihydro-2H-pyran or a 2-alkoxy or 2-acyloxy derivative of 3,4-dihydro-2H-pyran. The alkoxy or acyloxy group $R_1$ is preferably a lower alkoxy or acyloxy group having, for example, not more than six carbon atoms, and the methoxy, ethoxy, acetoxy and propoxy groups are especially preferred. Mixtures of any two or more of the above organic reactants may also be employed.

The reaction may suitably be carried out by passing a mixture of the reactant gases, preferably in the presence of steam, through a heated catalyst bed, which is preferably in fluidised condition. It is preferred that the organic reactant should not be mixed with either the ammonia or oxygen until immediately before passage through the catalyst bed.

Catalysts suitable for use in the present invention include those catalysts which may be regarded as dehydration and/or cracking catalysts. The catalysts may in addition possess an oxidative function. Amongst suitable catalysts, for example, may be mentioned catalysts comprising alumina, or silica-alumina. Metal oxides and/or salts in the presence of dehydration or cracking catalysts, particularly in the presence of silica, alumina, or silica-alumina, may also be found effective if stable at the reaction temperature; suitable metal oxides include cadmium oxide, lead oxide, zinc oxide, molybdenum trioxide, titanium dioxide, zirconium oxide, or an oxide of an element of the lanthanum series, or a mixture of any two or more such oxides (the elements of the lanthanum series are those elements having an atomic number in the range from 57 to 70 inclusive). Suitable metal salts include, for example, lead fluoride, sodium or potassium carbonate and sodium or potassium sulphate.

A preferred catalyst comprises alumina or silica-alumina with or without one or more of the other oxides or salts referred to above.

Where appropriate, the alumina or silica-alumina may be impregnated with a compound or compounds of the other element or elements, which may then be converted, if desired, into the oxide, or a stable salt. Catalysts may be prepared, for example, by impregnating alumina or silica-alumina with a nitrate or other soluble salt of one of the desired metals from solution in water, following which the material may be dried and heated at about 500° C. in a slow stream of air.

Whichever catalyst is employed, it is preferably in a finely divided state suitable for the maintenance of a fluidised bed during the passage of the reactants, although the use of a fixed bed of catalyst is within the scope of the invention.

The reaction takes place in the vapour phase and at an elevated temperature, and the heated reactants may suitably be passed through a bed of catalyst heated to a temperature within the range from 300° to 550° C., although this range should not be construed as limiting, since higher or lower temperatures may be employable in some cases.

The reactants may be employed in a moderately wide range of relative concentrations in the reactant mixture. Thus, for example, the mole ratio of organic reactant to ammonia may suitably be within the range from 1:1 to 1:10, a mole ratio within the range from 1:1 to 1:7 being particularly preferred. Within these ranges, the mole ratio of organic reactant to molecular oxygen may also vary fairly widely, but is preferably within the range from 1:1 to 1:10. The mole ratio of organic reactant to steam may also vary within fairly wide limits, but is preferably within the range from 1:1 to 1:20. The time of contact of the reactants with the catalyst is also capable of fairly wide variation, but it is not normally necessary for this time to exceed about 25 seconds, a range from about 0.5 second to 25 seconds, measured at N.T.P. being particularly preferred. The reaction may be carried out at atmospheric pressure, superatmospheric pressure or subatmospheric pressure.

The pyridine produced by the process of the invention may be recovered from the reaction product by any suitable method, for example by distillation or by extraction with a suitable solvent. When pyridine is to be distilled from the reaction product it is preferred to add an alkali, such as an alkali metal hydroxide or lime, to the mixture before distillation, to avoid contamination of the distillate with ammonium carbonate; excess ammonia from the reaction product is also recovered during distillation in this manner. A preferred separation process involves extraction with a solvent for pyridine, such as benzene or one of its homologues, followed by recovery of the pyridine from the extract by fractional distillation or other suitable process. Residual pyridine in the raffinate from the extraction may be recovered together with ammonia, by distillation with lime.

While the reaction may be continued for a considerable period without deactivation of the catalyst, especially in the presence of steam as a diluent, it may nevertheless be found desirable to regenerate the catalyst at suitable intervals. Regeneration may be carried out by discontinuing the reactant flow and passing molecular oxygen, suitably in the form of air, over the heated catalyst, preferably in admixture with steam. The regeneration may be caried out at a temperature within the range suitable for the reaction of the invention, suitably at a temperature at or above the temperature at which the catalyst is to be used for further reaction.

The invention is illustrated by the following examples. While the examples illustrate the use of a wide range of reactants, catalysts, concentrations and reaction conditions, it will be appreciated that comparable results are obtained when other modifications are made within the scope of the claims. In the examples, all contact times are measured at N.T.P., and all yields are based upon the organic reactant fed to the reaction zone. Throughout the examples, $$\text{Contact Time} = \frac{\text{Gross volume in ml. occupied by catalyst}}{\text{Total gas flow in ml./sec., at N.T.P.}}$$

*Example 1*

A gaseous mixture of tetrahydrofurfuryl alcohol (5% by volume), ammonia (25% by volume), air (37.5% by volume) and nitrogen (32.5% by volume) was passed at 400° C. over a catalyst consisting of ceric oxide (10% w./w.) supported on alumina. The contact time was 1.6 seconds. The gases from the reaction zone were cooled to give a liquid product containing pyridine. The uncondensed gases were scrubbed with water to recover a further yield of pyridine. The total yield of pyridine was 55%.

Similar results were obtained using a catalyst containing 5% w./w. of zirconium oxide supported on alumina.

*Example 2*

A gaseous mixture of 3,4-dihydro-2H-pyran (5.1% by volume), ammonia (25.1% by volume), air (39.7% by volume) and nitrogen (30.1% by volume) was passed at 400° C. over the catalyst of Example 1 with a contact time of 1.6 seconds. The product pyridine was recovered as in Example 1, and the total yield was 55%.

Again, similar results were obtained using a catalyst containing 5% w./w. zirconium oxide supported on alumina.

*Example 3*

A gaseous mixture of tetrahydrofurfuryl alcohol (5.3% by volume), ammonia (25.0% by volume) air (49.6% by volume) and nitrogen (20.1% by volume) was passed at 400° C. and a contact time of 1.6 seconds over a catalyst consisting of didymium oxide (approx. 10% w./w.) supported on alumina; didymium oxide is a mixture of the oxides of praseodymium and neodymium. The pyridine produced was recovered as in Example 1, and the total yield of pyridine was 56%.

*Example 4*

The procedure of Example 3 was repeated using tetrahydrofurfuryl alcohol (5.6% by volume), ammonia (24.8% by volume), air (49.8% by volume) and nitrogen (19.8% by volume), and a catalyst consisting of lanthanum oxide (10% w./w.) supported on alumina. The total yield of pyridine was 54%.

*Example 5*

The procedure of Example 3 was repeated using a catalyst consisting of mixed oxides of elements of the lanthanum series (total approximately 10% w./w.) supported on alumina. The mixture of oxides, exclusive of alumina, contained approximately 45% by weight of cerium oxide ($CeO_2$), 23% by weight of lanthanum oxide ($La_2O_3$), 6% of praseodymium oxide ($Pr_6O_{11}$), 18% of neodymium oxide ($Nd_2O_3$), 3% of samarium oxide ($Sm_2O_3$) and 5% of other oxides of elements of the lanthanum series. The total yield of pyridine was 62%.

*Example 6*

A gaseous mixture of tetrahydrofurfuryl alcohol (4.8 parts by volume) steam (25.6 parts by volume), ammonia (23.2 parts by volume) and air (46.4 parts by volume) was passed at 400° C. over a catalyst consisting of ceric oxide (10% w./w.) supported on alumina (8–16 mesh B.S.S.). The contact time was 1.5 seconds. The pyridine was recovered as in Example 1, and in consecutive runs with the same charge of catalyst, without regeneration, the yields of pyridine were respectively 77%, 77%, 64% and 62% over periods of seven hours.

The inclusion of steam in the feed gave a significant improvement over the results of a similar experiment in which steam was omitted, in respect of yield, tar formation, and loss of catalyst activity.

*Example 7*

The procedure of Example 6 was repeated using the mixed oxide catalyst used in Example 5, and a contact time of 1.45 seconds. The total yield of pyridine over seven hours was 74%.

*Example 8*

A catalyst was prepared as follows: Ammonium molybdate (20 parts by weight) was dissolved in a mixture of water (40 parts by weight) and aqueous ammonium hydroxide (specific gravity 0.880: 7 parts by weight) and to this solution was added 2.8 parts by weight of potassium hydroxide. The resultant solution was added in small portions with stirring to 100 parts by weight of alumina which had been dried at 120° C. for 1 hour and cooled in the absence of moisture. The alumina was of 8–16 mesh size, B.S.S. The mixture was allowed to stand for one hour after the addition, following which it was dried for six hours at 125° C. and finally heated at 450° C. for 18 hours in a slow current of air.

A gaseous mixture of tetrahydrofurfuryl alcohol (4.95 parts by volume), steam (26.65 parts by volume), ammonia (19.1 parts by volume), and air (49.3 parts by volume), was passed at 400° C. over the resulting supported molybdenum trioxide catalyst at a contact time of 1.53 seconds. The pyridine was recovered as in Example 1 and the total yield of pyridine over a period of five hours was 69%.

*Example 9*

A catalyst was prepared by adding a solution of 18.3 parts by weight of zirconium nitrate in 60 parts by weight of water to 100 parts by weight of alumina, as described in Example 8, and the resulting mixture was dried at 120° C. for 4 hours and then heated slowly to 500° C. in a slow stream of air to decompose the zirconium nitrate. Finally the catalyst was heated at 500° C. for 17 hours in a slow current of air.

A gaseous mixture of tetrahydrofurfuryl alcohol (5.05 parts by volume), steam (27.3 parts by volume), ammonia (18.9 parts by volume) and air (48.75 parts by volume), was passed at 400° C. over a portion of the zirconium oxide catalyst thus produced at a contact time of 1.52 seconds. The pyridine was recovered as in Example 1, and the total yield over a period of 5 hours was 67%.

*Example 10*

Alumina of 8–16 mesh size B.S.S. (50 parts by weight) was shaken with 23.7 parts by weight of titanium tetrachloride in solution in 46 parts by weight of water. 31.7 parts by weight of aqueous ammonium hydroxide (specific gravity 0.880) was added with shaking. The titanium dioxide/alumina mixture was filtered off, washed with water until free of ammonium chloride, dried at 120° C. for 16 hours and shaken on a 16 mesh B.S.S. sieve to remove fine particles of titanium dioxide. It was then heated at 500° C. for 16 hours.

A gaseous mixture of tetrahydrofurfuryl alcohol (4.6 parts by volume), ammonia (23.4 parts by volume), air (46.3 parts by volume), and steam (25.7 parts by volume) was passed at 400° C. over a sample of the above catalyst so that the contact time was 1.5 seconds, and the pyridine was recovered as in Example 1. The yield of pyridine was 77%.

*Example 11*

A sample of 8–16 mesh size B.S.S. alumina was dried at 500° C. in a slow current of air for 17 hours.

A gaseous mixture of tetrahydrofurfuryl alcohol (5.0 parts by volume), steam (26.95 parts by volume), ammonia (18.8 parts by volume), and air (49.25 parts by volume) was passed at 400° C. over a portion of the alumina catalyst at a contact time of 1.52 seconds, and the pyridine was recovered as in Example 1. The total yield of pyridine over a period of five hours was 77%.

In a similar experiment, but using a catalyst which had not been pre-treated with air at 500° C., the total yield of pyridine was 71%.

*Example 12*

A synthetic silica-alumina catalyst ("Synclyst" 3A MS13/MD) containing 13% of alumina was dried at 120° for 16 hours.

A gaseous mixture of tetrahydrofurfuryl alcohol (4.8 parts by volume), steam (25.6 parts by volume), air (46.4 parts by volume) and ammonia (23.2 parts by volume), was passed at 400° C. over a sample of the silica-alumina catalyst at a contact time of 1.49 seconds, and the pyridine was recovered as in Example 1. The total yield of pyridine over a period of five hours was 65%.

*Example 13*

A gaseous mixture of tetrahydrofurfuryl alcohol (4.8 parts by volume), ammonia (23.2 parts by volume), air (46.4 parts by volume) and steam (25.6 parts by volume) was passed through a heated fluidised bed of silica-alumina catalyst (60 milliliters volume; "Synclyst" 3A MS13/HD containing 13% of alumina) in a tubular reactor of 1¼ inches internal diameter. The temperature of the catalyst bed was 415°–419° C., and the contact time was 8.9 seconds based on the stationary volume of the catalyst. The pyridine was recovered as in Example 1. During the first 73 hours the total yield of pyridine remained steady and averaged 72%, but the yield then began to decrease, and was 45% over the next 23 hours.

The catalyst was regenerated by passing air through it for five hours at 400° C. and the process continued as before, and the yield of pyridine during the first 28 hours was 65%. The catalyst was again regenerated at 400° C. using a mixture of air (42% by volume) and steam (58% by volume). A further reaction was commenced as before, and the yield in the first 46 hours was 73%.

*Example 14*

A gaseous mixture of tetrahydrofurfuryl alcohol (4.8 parts by volume), ammonia (22.6 parts by volume), air (47.6 parts by volume) and steam (25.0 parts by volume) was passed through a heated fluidised bed of spray-dried alumina of an average particle size of 70 microns, contained in a tubular reactor as used in Example 13. The temperature in the catalyst bed was 417° C. and the contact time was 8.8 seconds based on the stationary volume of the catalyst. The reaction products were recovered as in Example 1, and the total yield of pyridine over a period of six hours was 67%.

*Example 15*

A granular silica-alumina catalyst ("Sinclyst" 3A MS 13/MD, 6–16 mesh B.S.S.) was dried at 120° for several hours.

A gaseous mixture of 2-ethoxy-3,4-dihydro-2H-pyran (4.5 parts by volume), steam (25.2 parts by volume), air (47.2 parts by volume), and ammonia (23.1 parts by volume), was passed at 450° over a sample of the above catalyst. The contact time was 1.5 sec. The reaction products were recovered as in Example 1 and the total yield of pyridine, from a run lasting 5 hours was 31%.

*Example 16*

When the experiment described in Example 15 was repeated with a reaction temperature of 400°, the other conditions remaining as before, the yield of pyridine from a run lasting 5 hours was 42%.

*Example 17*

A catalyst comprising lead oxide supported on silica-alumina was prepared as follows. "Synclyst" 3A MS 13/MD silica-alumina catalyst (6–16 mesh B.S.S.) was dried at 120° for several hours. A solution of lead nitrate (0.8 part by weight) in water (35 parts by weight) was added slowly to 50 parts by weight of the dried solid which was stirred vigorously during the addition. The mixture was dried at 120° for 48 hours and then heated in a slow stream of air at 500° for 6 hours.

A gaseous mixture of 2-ethoxy-3,4-dihydro-2H-pyran (4.5 parts by volume), ammonia (23.6 parts by volume), air (46.3 parts by volume), and steam (25.6 parts by volume) was passed at 450° over a sample of the above catalyst. The contact time was 1.51 sec. The products were recovered as in Example 1. The total yield of pyridine from a run lasting 5 hours was 34%.

*Example 18*

A catalyst comprising cadmium oxide supported on silica-alumina was prepared as follows. "Synclyst" 3A MS 13/MD silica-alumina catalyst (6–16 mesh B.S.S.) was dried at 120° for several hours. A solution of cadmium nitrate (1.37 parts by weight; $Cd(NO_3)_2 \cdot 4H_2O$) in water (35 parts by weight) was added slowly to the dried solid which was stirred vigorously during the addition. The mixture was dried at 120° for 17 hours and then heated at 500° in a slow stream of air for 24 hours.

A gaseous mixture of 2-ethoxy-3,4-dihydro-2H-pyran (4.5 parts by volume), ammonia (23.6 parts by volume), air (46.4 parts by volume), and steam (25.5 parts by volume) was passed at 450° over a sample of the above catalyst. The contact time was 1.50 sec. The products were recovered as in Example 1. The total yield of pyridine from a run lasting 5 hours was 34%.

*Example 19*

A granular silica-alumina catalyst ("Synclyst" 3A MS 13/MD, 6–16 mesh B.S.S.) was dried at 120° for several hours.

A gaseous mixture of tetrahydrofurfurylamine (3.6 parts by volume), steam (40.6 parts by volume), air (37.4 parts by volume), and ammonia (18.4 parts by volume) was passed at 450° over a sample of the above catalyst. The contact time was 1.2 sec. The reaction products were recovered as in Example 1 and the total yield of pyridine from a run lasting 5 hours was 64%.

*Example 20*

A granular silica-alumina catalyst ("Synclyst" 3A MS 13/MD, 6–16 mesh B.S.S.) was dried at 120° for several hours. Fifty parts by weight of this dried catalyst were stirred vigorously while a solution of cadmium nitrate (1.37 parts by weight; $Cd(NO_3)_2 \cdot 4H_2O$) in water (35 parts by weight) was added slowly. The resultant catalyst was dried at 120° for 17 hours and then heated at 500° in a slow stream of air for 24 hours.

A gaseous mixture of tetrahydrofurfurylamine (4.4 parts by volume), steam (26.8 parts by volume), air (45.9 parts by volume), and amomnia (22.9 parts by volume) was passed at 450° over a sample of the above catalyst. The contact time was 1.47 sec. The reaction products were recovered as in Example 1. The total yield of pyridine from a run lasting 5 hours was 59%.

*Example 21*

A gaseous mixture of tetrahydrofurfuryl alcohol (4.8 parts by volume), ammonia (23.2 parts by volume), air (46.4 parts by volume), and steam (25.6 parts by volume) was passed through a heated fluidised bed of silica-alumina catalyst (150 ml. "Synclyst" 3A MS 13/HD) contained in a tubular reactor of 2 inches internal diameter. The temperature in the catalyst bed was 400°. The contact time was 4.5 seconds, based on the stationary volume of the catalyst. The reaction products were recovered as in Example 1. The total yield of pyridine was 68% over 23 hours.

The run was interrupted and the catalyst was regenerated by passing a mixture of air (42 parts by volume) and steam (58 parts by volume) through it at 400° for 3 hours. The experiment was then restarted with the same feed mixture and under the same conditions as above. The yield of pyridine was 77% for 5 hours, and then dropped to average 61% over the following 68 hours. The temperature of the catalyst bed was increased to 450° and a 74% yield obtained over 68 hours.

*Example 22*

A gaseous mixture of tetrahydrofurfuryl alcohol (1.3 parts by volume), ammonia (18.4 parts by volume), air (36.9 parts by volume), and steam (43.4 parts by volume) was passed through a heated fluidised bed of silica-alumina catalyst (300 ml. "Synclyst" 3A MS 13/HD) contained in a tubular reactor of 2 inches internal diameter, for 20 minutes. The temperature of the catalyst bed was 400°. Over the following 20 minutes the amount of steam in the feed was gradually decreased and the amount of tetrahydrofurfuryl alcohol increased until the feed mixture had the same composition as in Example 21. With this mixture the contact time was 8.9 seconds, based on the stationary volume of the catalyst. The reaction products were recovered as in Example 1. The total yield of pyridine remained steady over 241 hours and averaged 81%.

*Example 23*

A gaseous mixture of the same composition as that described in Example 21 was passed through a fluidised bed of silica-alumina catalyst (600 ml.; as used in Example 21) heated to 400°, contained in a tubular reactor of 2 inches internal diameter. The contact time was 17.8 seconds, based on the stationary volume of the catalyst. The reaction products were recovered as in Example 1. The yield gradually increased from 67% in the first 2 hours to 79% after 23 hours, and averaged 73% over 29 hours.

*Example 24*

A gaseous mixture of the same composition as that described in Example 21 was passed through a fluidised bed of silica-alumina catalyst (30 ml.; as used in Example 21) contained in a tubular reactor of 1¼ inches internal diameter. The temperature in the catalyst bed was 400°, and the contact time was 4.5 sec., based on the stationary volume of the catalyst. At stages during the experiment the concentration of ammonia in the feed mixture was decreased and nitrogen was added to the feed to maintain the same contact time. The yields obtained are shown in the table below.

weight of pyridine. It was extracted with five portions of benzene (each of 53 parts by weight). The aqueous residue contained 7 parts by weight of pyridine. The combined benzene extracts were fractionally distilled and 95.7 parts by weight of pyridine were recovered.

The aqueous raffinate was treated with alkali (lime) and distilled to recover unreacted ammonia and the remainder of the pyridine.

*Example 27*

A gaseous mixture of tetrahydrofurfuryl alcohol (4.9 parts by volume), ammonia (22.8 parts by volume), air (46.0 parts by volume), and steam (26.3 parts by volume) was passed at 450° over a sample if silica-alumina catalyst ("Synclyst" 3A MS 13/MD, 6–16 mesh B.S.S.) which had previously been dried at 120° for several hours. The contact time was 1.47 sec. The reaction products were recovered as in Example 1 and the total yield of pyridine from a run lasting 5 hours was 73%.

*Example 28*

A gaseous mixture of tetrahydrofurfuryl alcohol (2.93 parts by volume), ammonia (14.6 parts by volume), air (29.6 parts by volume), and steam (52.8 parts by volume) was passed at 450° over a sample of "Synclyst" 3A MS 13/MD silica-alumina catalyst (6–16 mesh) which had previously been dried at 120° for several hours. The contact time was 1.51 sec. The total yield of pyridine from a run lasting 5 hours was 78%.

*Example 29*

A gaseous mixture of 3,4-dihydro-2H-pyran (4.05 parts by volume), ammonia (18.1 parts by volume), air (47.15 parts by volume), and steam (30.7 parts by volume) was passed at 355° over a sample of activated bauxite so that the contact time was 2.92 sec. The total yield of pyridine from a run lasting 5 hours was 67%.

When the experiment was repeated with a reaction temperature of 375° and a contact time of 1.52 sec. the yield of pyridine was 66%. With a reaction temperature of 400° and a contact time of 1.56 sec. the yield was also 66%.

*Example 30*

A catalyst comprising a mixture of vanadium and manganese oxides supported on alumina was prepared as follows. Alumina (8–16 mesh B.S.S.; 100 parts by weight) was dried at 120° for 1 hour and cooled in the absence of moisture. Vanadium pentoxide (3.6 parts by weight) was suspended in water (15 parts by weight) at 50° and oxalic acid dihydrate (15 parts by weight) was added in portions at this temperature. To the solu-

TABLE

| Contact Time (sec.) | Percent THFA | Percent Ammonia | Percent Steam | Percent Air | Percent Nitrogen | Duration of Run (hr.) | Percent Yield |
|---|---|---|---|---|---|---|---|
| 4.5 | 4.8 | 23.2 | 25.6 | 46.4 | ---------- | 2 | 77 |
| 4.5 | 5.0 | 14.0 | 27.0 | 46.0 | 8.0 | 24 | 78 |
| 4.4 | 4.8 | 9.7 | 26.1 | 45.0 | 14.4 | 8 | 77 |
| 4.5 | 5.0 | 7.0 | 27.4 | 44.3 | 16.3 | 6 | 75 |

*Example 25*

Under the conditions used in Example 14 and with a feed of the same composition a silica-alumina catalyst containing 25% alumina ("Synclyst" 3A MS 25 Grade 68) produced a yield of 79% pyridine over 13 hours.

*Example 26*

A sample (494 parts by weight) of the condensate from the experiment described in Example 22 was estimated, by gas chromatography, to contain 106 parts by tion thus obtained was added a solution of manganese nitrate hexahydrate (11.28 parts by weight) in water (20 parts by weight) and the resulting solution was then added slowly to the dried alumina which was stirred vigorously. Finally the mixture was dried at 120° for 1 hour, at 400° for 17 hours and at 500° for 18 hours.

A gaseous mixture of tetrahydrofurfuryl alcohol (4.8 parts by volume), ammonia (23.2 parts by volume), air (46.3 parts by volume), and steam (25.7 parts by volume) was passed at 400° over a sample of the above catalyst. The contact time was 1.50 sec. The total yield of pyridine from a run lasting 5 hours was 55%.

*Example 31*

A gaseous mixture of tetrahydrofurfuryl alcohol (4.7 parts by volume), ammonia (23.0 parts by volume), air (46.7 parts by volume), and nitrogen (25.6 parts by volume) was passed at 400° over a fresh portion of the catalyst used in Example 30, so that the contact time was 1.48 sec. The total yield of pyridine after 5 hours was 44%.

*Example 32*

A catalyst comprising zinc oxide supported on silica-alumina was prepared as follows: "Synclyst" 3A MS 13/MD silica-alumina catalyst (6–16 mesh B.S.S.) was dried for several hours at 120°. A solution of zinc nitrate (2.27 parts by weight; $Zn(NO_3)_2.6H_2O$) in water (35 parts by weight) was added slowly to 50 parts by weight of the dried material which was stirred vigorously during the addition. The mixture was dried at 120° for 17 hours and then at 500° in a slow stream of air for 24 hours.

A gaseous mixture of tetrahydrofurfuryl alcohol (4.8 parts by volume), ammonia (23.2 parts by volume), air (46.3 parts by volume), and steam (25.7 parts by volume) was passed at 400° over a sample of the above catalyst. The contact time was 1.49 sec. The total yield of pyridine from a run lasting 5 hours was 61%. The amount of unchanged alcohol in the product was 4% of the initial amount. The efficiency of conversion into pyridine was therefore 63%.

*Example 33*

A gaseous mixture of tetrahydrofurfuryl alcohol (4.6 parts by volume), ammonia (9.4 parts by volume) air (48.3 parts by volume), nitrogen (13.0 parts by volume), and steam (24.7 parts by volume) was passed at 400° over a sample of silica-alumina catalyst ("Synclyst" 3A MS 13/MD, 6–16 mesh B.S.S.) which had previously been dried at 120° for several hours. The contact time was 1.45 sec. The total yield of pyridine from a run lasting 5 hours was 67%.

*Example 34*

A catalyst comprising cadmium oxide supported on silica-alumina was prepared as follows: "Synclyst" 3A MS 13/MD silica-alumina catalyst (6–16 mesh B.S.S.) was dried at 120° for several hours. A solution of cadmium nitrate (1.37 parts by weight; $Cd(NO_3)_2.4H_2O$) in water (35 parts by weight) was added slowly to the dried solid which was stirred vigorously during the addition. The mixture was dried at 120° for 17 hours, and then heated at 500° in a slow stream of air for 24 hours.

A gaseous mixture of tetrahydrofurfuryl alcohol (4.9 parts by volume), ammonia (22.6 parts by volume), air (46.0 parts by volume), and steam (26.5 parts by volume) was passed at 400° over a sample of the above catalyst. The contact time was 1.46 sec. The total yield of pyridine from a run lasting 5 hours was 66%.

Repetition of the above experiment but at a temperature of 450° gave a total yield of pyridine of 73% from a run lasting 5 hours.

Repetition of the latter experiment (450°), but with a feed comprising tetrahydrofurfuryl alcohol (3.8 parts by volume), ammonia (18.3 parts by volume), air (35.9 parts by volume), and steam (42.0 parts by volume) and a contact time of 1.28 seconds gave a total yield of pyridine of 76% from a run lasting 5 hours.

*Example 35*

A catalyst comprising lead oxide supported on silica-alumina was prepared as follows: "Synclyst" 3A MS 13/MD silica-alumina catalyst (6–16 mesh B.S.S.) was dried at 120° for several hours. A solution of lead nitrate (0.8 part by weight) in water (35 parts by weight) was added slowly to 50 parts by weight of the dried solid which was stirred vigorously during the addition. The mixture was dried at 120° for 48 hours, and then heated in a slow stream of air at 500° for 6 hours.

A gaseous mixture of tetrahydrofurfuryl alcohol (4.8 parts by volume), ammonia (23.0 parts by volume), air (46.7 parts by volume), and steam (25.5 parts by volume) was passed at 400° over a sample of the above catalyst. The contact time was 1.48 sec. The total yield of pyridine from a run lasting 5 hours was 72%.

When the experiment was repeated with a reaction temperature of 450°, the other conditions and contact time being the same as before, the total yield of pyridine from a run lasting 5 hours was 71%.

*Example 36*

A gaseous mixture of tetrahydrofurfuryl alcohol (4.7 parts by volume), ammonia (23.4 parts by volume), air (46.8 parts by volume), and steam (25.1 parts by volume) was passed at 450° over a sample of the zinc oxide/silica-alumina catalyst described in Example 32. The contact time was 1.50 sec. The total yield of pyridine was 67%. The products did not contain any unchanged alcohol.

*Example 37*

Alumina (8–16 mesh B.S.S.) was dried at 130° for several hours and cooled in the absence of moisture. A solution of syrupy phosphoric acid (3.85 parts by weight; s.g. 1.75) in water (60 parts by weight) was added slowly to 100 parts by weight of the dried alumina which was stirred vigorously throughout the addition. The alumina was then dried at 130° for 2 hours, and heated at 500° for 17 hours.

A gaseous mixture of tetrahydrofurfuryl alcohol (4.95 parts by weight), ammonia (19.1 parts by weight), air (49.4 parts by weight), and steam (26.55 parts by weight) was passed at 400° over a sample of the above catalyst. The contact time was 1.54 sec. The total yield of pyridine from a run lasting 5 hours was 71%.

*Example 38*

A catalyst comprising potassium carbonate supported on silica-alumina was prepared as follows: "Synclyst" 3A MS 13/MD silica-alumina (6–16 mesh B.S.S.) was dried at 120° for several hours. A solution of potassium carbonate (0.88 part by weight) in water (35 parts by weight) was added slowly to 50 parts by weight of the dried solid which was stirred vigorously. The resulting solid was dried at 120° for 17 hours.

A gaseous mixture of tetrahydrofurfuryl alcohol (4.8 parts by volume), ammonia (23.2 parts by volume), air (46.4 parts by volume), and steam (25.6 parts by volume) was passed at 400° over a sample of the above catalyst. The contact time was 1.50 sec. The total yield of pyridine from a run lasting 5 hours was 71%.

When the experiment was repeated with a reaction temperature of 450°, all other conditions remaining as before, the total yield of pyridine from a run lasting 5 hours was 77%.

*Example 39*

A catalyst comprising sodium carbonate supported on alumina was prepared as follows. Alumina (8–16 mesh B.S.S.) was dried at 120° for several hours and cooled in the absence of moisture. A solution of sodium carbonate (3.54 parts by weight) in water (60 parts by weight) was added slowly to the dried alumina (100 parts by weight) which was stirred vigorously during the addition. Finally the alumina was dried at 130° for 3 hours, and heated at 500° for 17 hours.

A gaseous mixture of 3,4-dihydro-2H-pyran (4.4 parts by volume), ammonia (19.7 parts by volume), air (50.2 parts by volume), and steam (25.7 parts by volume) was passed at 375° over a sample of the above catalyst. The contact time was 1.56 sec. The total yield of pyridine from a run lasting 5 hours was 67%.

Example 40

A catalyst comprising sodium sulphate supported on alumina was prepared as follows: Alumina 8–16 mesh B.S.S.) was dried at 130° for 1 hour. A solution of sodium sulphate (2.04 parts by weight) in water (60 parts by weight) was added slowly to the dried alumina (100 parts by weight) which was stirred vigorously throughout the addition. The alumina was dried at 130° for 3 hours and heated at 500° for 17 hours.

A gaseous mixture of tetrahydrofurfuryl alcohol (4.95 parts by volume), ammonia (19.15 parts by volume), air (49.4 parts by volume), and steam (26.5 parts by volume) was passed at 400° over a sample of the above catalyst. The contact time was 1.54 sec. The total yield of pyridine from a run lasting 5 hours was 73%.

Example 41

A gaseous mixture of 3,4-dihydro-2H-pyran (4.45 parts by volume), ammonia (19.5 parts by volume), air (50.2 parts by volume), and steam (25.8 parts by volume) was passed at 375° over a sample of the catalyst of Example 40. The contact time was 1.56 sec. The total yield of pyridine from a run lasting 5 hours was 66%.

Example 42

A catalyst comprising lead fluoride supported on silica-alumina was prepared as follows: "Synclyst" 3A MS 13/MD silica-alumina catalyst (6–16 mesh B.S.S.) was dried at 120° for several hours. A solution of lead acetate (0.932 part by weight; $Pb(C_2H_3O_2)_2.3H_2O$) in water (30 parts by weight) was added slowly to 50 parts by weight of the dried solid which was stirred vigorously during the addition. The product was dried at 120° for 2 hours and then stirred vigorously while a solution of ammonium bifluoride (0.146 part by weight) in water (30 parts by weight) was added slowly. The final solid was dried at 120° for 2 hours and heated at 500° for 17 hours.

A gaseous mixture of tetrahydrofurfuryl alcohol (4.9 parts by volume), ammonia (22.9 parts by volume), air (45.8 parts by volume), and steam (26.4 parts by volume) was passed at 450° over a sample of the above catalyst. The contact time was 1.48 sec. The total yield of pyridine from a run lasting 5 hours was 77%.

Example 43

A gaseous mixture of tetrahydrofurfuryl alcohol (4.9 parts by volume), ammonia (19.2 parts by volume), air (49.5 parts by volume), steam (26.35 parts by volume), and sulphur dioxide (0.05 part by volume) was passed at 400° over a sample of alumina (8–16 mesh B.S.S.) which had previously been dried at 500° for 17 hours. The contact time was 1.55 sec. The total yield of pyridine from a run lasting 5 hours was 74%.

Example 44

A gaseous mixture of 3,4-dihydro-2H-pyran (4.7 parts by volume), ammonia (19.4 parts by volume), air (50.2 parts by volume), steam (25.55 parts by volume), and sulphur dioxide (0.05 part by volume) was passed at 400° over a sample of activated bauxite so that the contact time was 1.56 sec. The total yield of pyridine from a run lasting 5 hours was 74%.

Example 45

A gaseous mixture of 3,4-dihydro-2H-pyran (4.8 parts by volume), ammonia (23.2 parts by volume), air (46.4 parts by volume), and steam (25.6 parts by volume) was passed through a fluidised bed of silica-alumina catalyst (300 ml.; type as Example 13) contained in a tubular reactor of 2 inches internal diameter. The temperature of the catalyst bed was 400°, and the contact time 8.9 seconds, based on the stationary volume of the catalyst. The reaction products were recovered as described in Example 1. The total yield of pyridine, based on dihydropyran fed to the reaction zone, from a run lasting 6½ hours was 70%.

Example 46

A catalyst comprising cadmium oxide supported on silica-alumina was prepared as follows. A solution of cadmium nitrate (4.2 parts by weight; $Cd(NO_3)_2.4H_2O$) in water (250 parts by weight) was added slowly to "Synclyst" 3A MS 13 Grade 68 silica-alumina (156 parts by weight) which was stirred vigorously during the addition. The mixture was dried at 120° for 16 hours and then heated at 450° in a slow stream of air for 24 hours.

A gaseous mixture of tetrahydrofurfuryl alcohol (4.8 parts by volume), ammonia (23.2 parts by volume), air (46.4 parts by volume), and steam (25.6 parts by volume) was passed at 400° through the above catalyst (300 ml.) contained in a tubular reactor of 2 inches internal diameter. The contact time was 8.9 seconds, based on the stationary volume of the catalyst. The reaction products were recovered as in Example 1. The total yield of pyridine, based an tetrahydrofurfuryl alcohol fed to the reaction zone, from a run lasting 28 hours was 78%.

We claim:
1. The process for the production of pyridine by the catalytic reaction in the vapour phase and at an elevated temperature, of ammonia and at least one compound selected from the compounds:

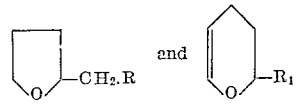

wherein R is selected from the group consisting a hydroxyl group and an amino group, and $R_1$ is selected from the group consisting of an alkoxy group, an acyloxy group and the hydrogen atom, characterized in that oxygen is included in the reaction mixture.

2. The process as claimed in claim 1 in which the catalytic reaction is carried out in the presence of steam.

3. The process as claimed in claim 1 in which the organic reactant is tetrahydrofurfuryl alcohol.

4. The process as claimed in claim 1 in which the organic reactant is 3,4-dihydro-2H-pyran.

5. The process as claimed in claim 1 in which the organic reactant is tetrahydrofurfurylamine.

6. The process as claimed in claim 1 in which the organic reactant is 2-methoxy-3,4-dihydro-2H-pyran.

7. The process as claimed in claim 1 in which the organic reactant is 2-ethoxy-3,4-dihydro-2H-pyran.

8. The process as claimed in claim 1 in which the organic reactant is 2-acetoxy-3,4-dihydro-2H-pyran.

9. The process as claimed in claim 1 in which the organic reactant is vaporised and mixed with the other components of the reaction mixture immediately before passage through a heated bed of catalyst.

10. The process as claimed in claim 1 in which the reaction takes place in the presence of a dehydration catalyst.

11. The process as claimed in claim 1 in which the catalyst comprises a member of the group consisting of alumina, and silica-alumina.

12. The process as claimed in claim 1 in which the reaction takes place in the presence of a catalyst which possesses a dehydration and an oxidation function.

13. The process as claimed in claim 1 in which the catalyst comprises at least one member of the group consisting of metal oxides and salts stable at the reaction temperature.

14. The process as claimed in claim 13 in which the catalyst additionally comprises a member selected from the group consisting of alumina, silica, and mixtures thereof.

15. The process as claimed in claim 1 in which the catalyst contains a metal oxide selected from the group consisting of cadmium oxide, lead oxide, zinc oxide molybdenum trioxide, titanium dioxide, zirconium oxide, an oxide of an element of the lanthanum series, and mixtures thereof.

16. The process as claimed in claim 1 in which the catalyst contains a metal salt selected from the group consisting of lead fluoride, sodium carbonate, potassium carbonate, sodium sulphate and potassium sulphate and mixtures thereof.

17. The process as claimed in claim 1 in which the catalyst is in fluidised condition.

18. The process as claimed in claim 1 in which the reaction takes place at a temperature within the range from 300 to 550° C.

19. The process as claimed in claim 1 in which the mole ratio of organic reactant to ammonia is within the range from 1:1 to 1:10.

20. The process as claimed in claim 1 in which the mole ratio of organic reactant to ammonia is within the range from 1:1 to 1:7.

21. The process as claimed in claim 1 in which the mole ratio of organic reactant to molecular oxygen is within the range from 1:1 to 1:10.

22. The process as claimed in claim 2 in which the mole ratio of organic reactant to steam is within the range from 1:1 to 1:20.

23. The process as claimed in claim 1 in which the contact time, measured at N.T.P. on the stationary volume of the catalyst is at most 25 seconds.

24. The process as claimed in claim 1 in which the contact time, measured at N.T.P. on the stationary volume of the catalyst is within the range from 0.5 second to 25 seconds.

25. The process as claimed in claim 1 in which the pyridine is recovered from the product mixture by extraction with an aromatic hydrocarbon.

26. The process as claimed in claim 25 in which the aromatic hydrocarbon is benzene.

27. The process as claimed in claim 1 in which pyridine is recovered from the product mixture by distillation.

28. The process as claimed in claim 27 in which the distillation is carried out in the presence of alkali.

29. The process as claimed in claim 1 in which the catalyst is regenerated before re-use.

30. The process as claimed in claim 29 in which the regeneration is carried out by heating the catalyst in a stream of air at a temperature within the range from 300° to 550° C.

31. The process as claimed in claim 29 in which the regeneration is carried out by heating the catalyst in a stream of air mixed with steam to a temperature within the range from 300° to 550° C.

References Cited by the Examiner

UNITED STATES PATENTS

| | | | |
|---|---|---|---|
| 2,528,978 | 11/1950 | Smith et al. | 260—290 |
| 2,741,618 | 4/1956 | Young et al. | 260—290 |
| 2,963,484 | 12/1960 | Denton | 260—290 |

WALTER A. MODANCE, *Primary Examiner.*

A. L. ROTMAN, *Assistant Examiner.*